United States Patent
Bird

[11] 3,840,934
[45] Oct. 15, 1974

[54] VEHICLE HEADLAMP WIPER ASSEMBLY
[76] Inventor: Arthur P. Bird, Box 24, Stollings, W. Va. 25646
[22] Filed: Aug. 17, 1972
[21] Appl. No.: 281,509

[52] U.S. Cl................ 15/250.3, 15/250 A, 91/347, 92/137
[51] Int. Cl. ............................................ B60s 1/10
[58] Field of Search.......... 15/250.3, 250.22, 250 A; 91/186, 346, 347; 92/137

[56] References Cited
UNITED STATES PATENTS

| | | | |
|---|---|---|---|
| 1,119,425 | 12/1914 | Guerin.............................. | 91/347 X |
| 1,309,724 | 7/1919 | Folberth ........................... | 15/250.3 |
| 1,638,897 | 8/1927 | Vaughan........................... | 91/186 X |
| 1,696,044 | 12/1928 | Kuskin.............................. | 92/137 X |
| 2,302,232 | 11/1942 | MacNeil ........................... | 91/347 X |
| 2,332,664 | 10/1943 | Orshansky, Jr. et al. ......... | 91/347 X |
| 3,641,613 | 2/1972 | Povilaitis et al. ................. | 15/250.02 |

Primary Examiner—Peter Feldman
Attorney, Agent, or Firm—Clarence A. O'Brien; Harvey B. Jacobson

[57] ABSTRACT

A vehicle headlamp wiper assembly comprising a mounting bracket fastened to a headlamp rim, a fluid motor carried by the bracket forward of the headlamp, and a wiper blade drivingly connected to the motor for reciprocal rotary movement over substantially the entire lens surface of the headlamp, the motor including valve means for automatically reversing the direction of wiper blade movement after each rotation.

7 Claims, 10 Drawing Figures

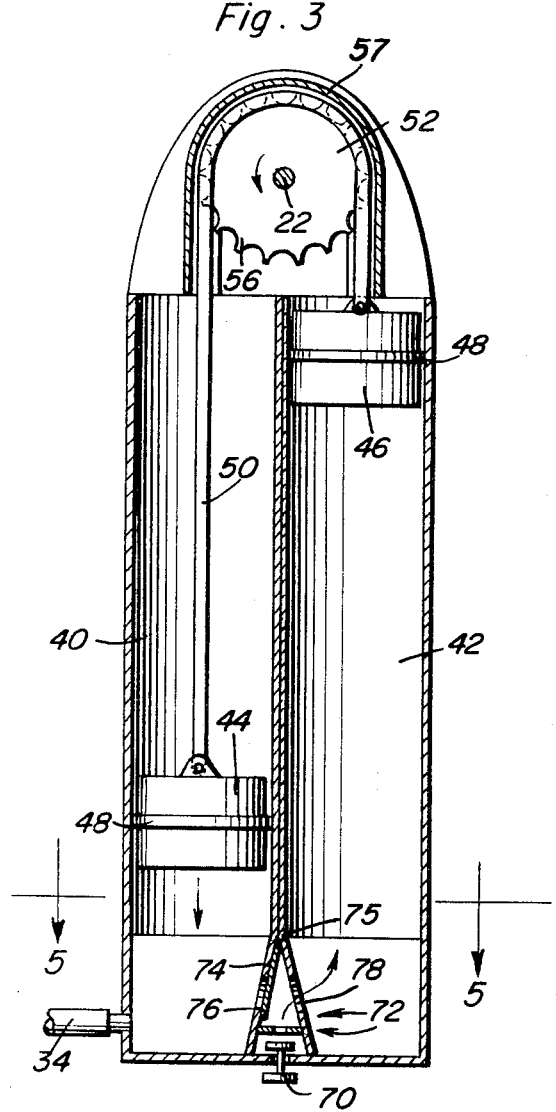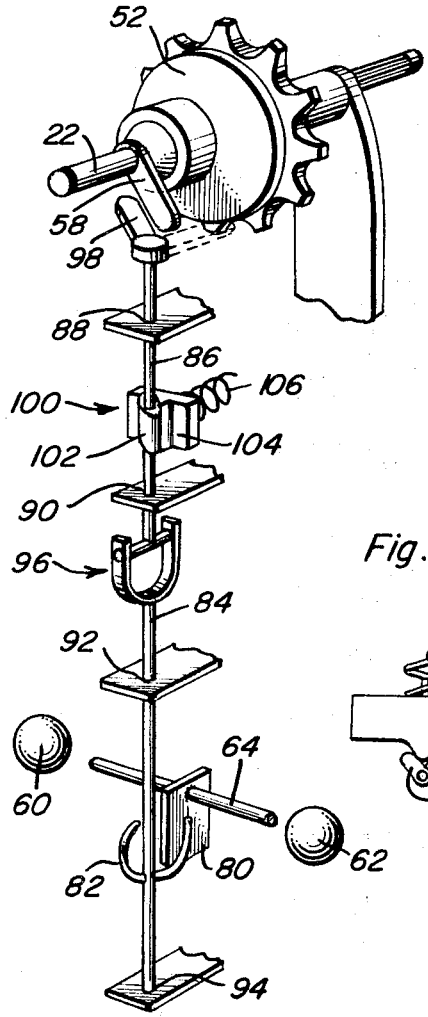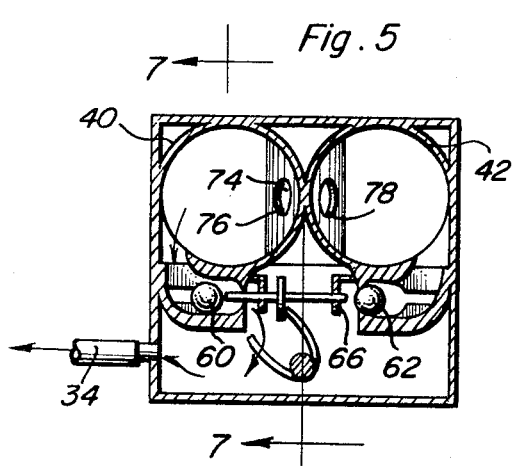

VEHICLE HEADLAMP WIPER ASSEMBLY

The present invention is generally related to automotive vehicle headlamps and, more particularly, to an assembly for automatically cleaning vehicle headlamps by remote controls operated by the vehicle driver.

In recent years, concern over vehicle safety has prompted many changes in vehicle design and construction. The seat belt, for example, has proven to be the forerunner in prevention of highway fatalities, with many improvement having been made such as electrical systems for reminding the driver and passengers to "buckle-up." It has also been recognized that visibility is of prime importance to safe vehicle operation. Systems have been proposed for automatically turning on vehicle headlights when the windshield wipers are operated. This both lights the vehicle so that it is readily recognizable by other drivers and, of course, improves the visibility of the driver. The extent to which the driver's visibility is improved, however, is dependent upon clean headlamp lenses. Insects, dirt and other pollutants normally along the highways come in contact with moving vehicles, particularly the headlamp lenses. This results in a buildup of contaminants on the lenses which significantly blocks the passage of light therethrough. These buildups may occur in a relatively short period of time, dependent upon the types of contaminants, vehicle speed, and other factors.

In many cases the vehicle operators are aware of poor visibility due to contaminants appearing on the windshield, but are not consciously aware of similar contaminants which significantly hinder the passage of light through the headlamp lenses. While their lights are turned on for night driving or driving in inclement weather, the operators often do not realize that their visibility is inadequate to operate the vehicle at the posted speed limit. Furthermore, even if the operator is aware of contamination of the headlight lenses, it is necessary to stop the vehicle and manually clean the lenses. This solution offers only temporary relief, as contaminants will continue to build up as the operator resumes driving.

Therefore, it is an object of the present invention to provide a novel vehicle headlamp wiper assembly including a blade which is rotatably driven in a reciprocal fashion over the headlamp lens to effect automatic cleaning thereof, to increase driver visibility and improve the safety of the vehicle operation.

Another object of the present invention is to provide a vehicle headlamp wiper assembly including a unique fluid motor with a pair of reciprocating pistons which drive a sprocketed belt or the like to effect rotary motion of a wiper blade over the headlamp lens.

It is a further object of the present invention to provide a versatile vehicle headlamp wiper assembly including a fluid motor with a pair of pistons reciprocally mounted in cylinders which are alternately communicated with a fluid vacuum source, or the like, by way of a valve mechanism, whereby the direction of wiper blade rotation is reversed approximately every 360 degrees.

Still another object of the present invention is to provide a novel vehicle headlamp wiper assembly including a fluid motor with a valve mechanism responsive to wiper blade position by way of a lost-motion, snap-action coupling, whereby the valve mechanism is rapidly reversed each time the wiper blade completes a revolution.

These together with other objects and advantages which will become subsequently apparent reside in the details of construction and operation as more fully hereinafter described and claimed, reference being had to the accompanying drawings, forming a part hereof, wherein like numerals refer to like parts throughout.

FIG. 3 is a sectional view of the fluid motor associated with the present invention.

FIG. 4 is a simplified perspective view of the coupling between the fluid motor valve mechanism and wiper drive shaft associated with the present invention.

FIG. 4a is a top plan view of the snap-action mechanism associated with the coupling illustrated in FIG. 4.

FIG. 5 is a sectional view taken along section 5—5 of FIG. 3, with the left valve being opened.

FIG. 6 is a sectional view similar to FIG. 5 but with the right valve opened.

Figure 1:
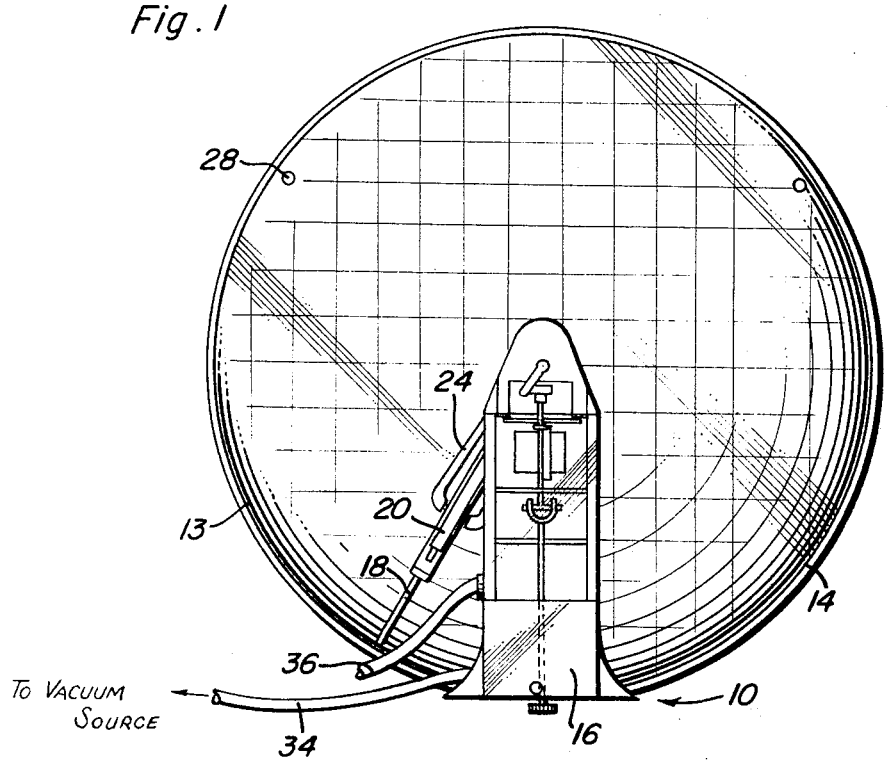
FIG. 1 is a front elevation of the wiper assembly of the present invention mounted to a typical vehicle headlamp.
Figure 2:
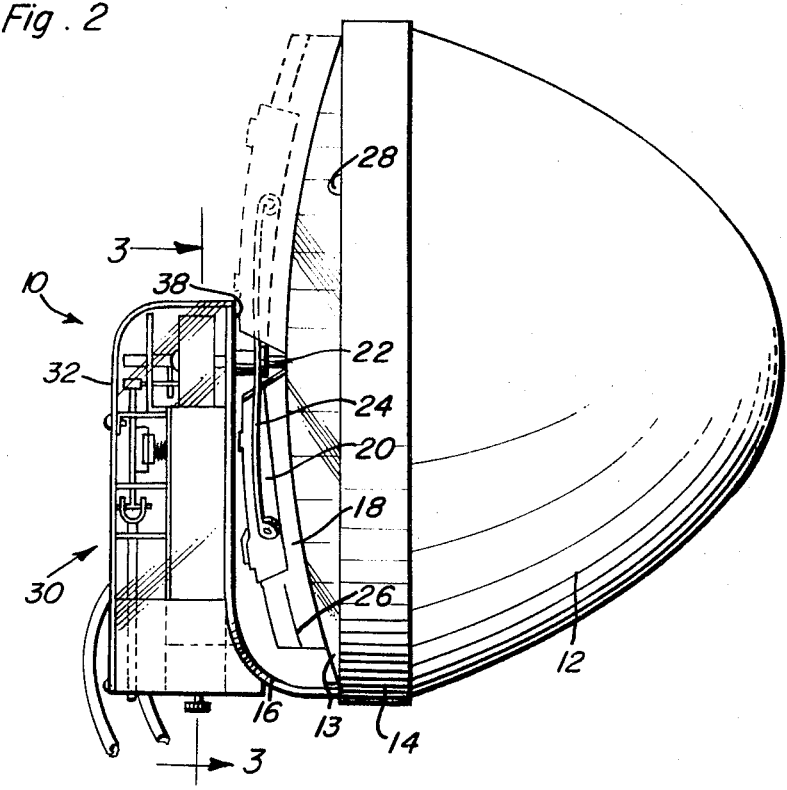
FIG. 2 is a side elevation of the assembly and headlamp shown in FIG. 1.

Referring now, more particularly, to FIGS. 1 and 2 of the drawings, the vehicle headlamp wiper assembly of the present invention is generally indicated by the numeral 10, and is illustrated as being mounted to a conventional vehicle headlamp 12 with a lens of slightly convex configuration. The lamp is held in position by way of a circular mounting ring 14 attached to the vehicle in a conventional manner. The wiper assembly is provided with a relatively rigid mounting bracket 16 which is retentatively fastened to the headlamp mounting ring 14. The mounting bracket is positioned forward of the headlamp and extends upwardly from ring 14 toward the center of the headlamp lens.

A wiper blade 18 of rubber or other resilient material is mounted to a wiper support arm 20, which in turn is affixed to a drive shaft 22 for rotation therewith. A pair of leaf springs 24 bias arm 20 toward the lamp lens to maintain blade 18 in snug wiping engagement with the lens during operation. Preferably, the wiper blade is provided with a slit or cut 26 at one end thereof which permits the blade to negotiate the bumps defined by the headlamp guide pins, as indicated at 28. Drive shaft 22 is supported at 23 and 25 by bracket 16 for rotation about a generally horizontal axis, and is connected to a fluid motor generally indicated by the numeral 30 for rotation thereby.

The fluid motor is provided with a housing or cover 32, preferably of light weight plastic material, that illustrated being of transparent plastic. The fluid motor is connected to an appropriate source of fluid energy, such as a vacuum source normally associated with vehicle engines by way of a fluid line 34. A second fluid line 36 extends from housing 32 for connection to an appropriate source of cleaning liquid which is selectively dispensed onto the headlamp lens by way of a nozzle as indicated at 38.

In operation, fluid motor 30 drives shaft 22 to rotate the wiper blade around the entire surface of the headlamp lens. Upon completion of a rotation, the direction of travel is reversed and the wiper blade returns to its initial starting position and the cycle is repeated. The fluid motor drives the wiper blade in a rotary reciprocal manner, whereby the entire surface area of the lens is wiped by the blade. Since the blade is split, as indicated at 26, substantially the entire length of blade remains in contact with the lens when passing the guide pins 28. Cleaning liquid may be selectively dispensed through nozzle 38 onto the lens, by way of conventional controls not illustrated, to aid the wiper blade in cleaning. Both the fluid motor and cleaning liquid controls are mounted in the vehicle, not shown, at a location convenient for driver operation. Valve means are incorporated into the fluid motor for automatically reversing the direction of blade rotation, as hereinafter explained.

Figure 7:
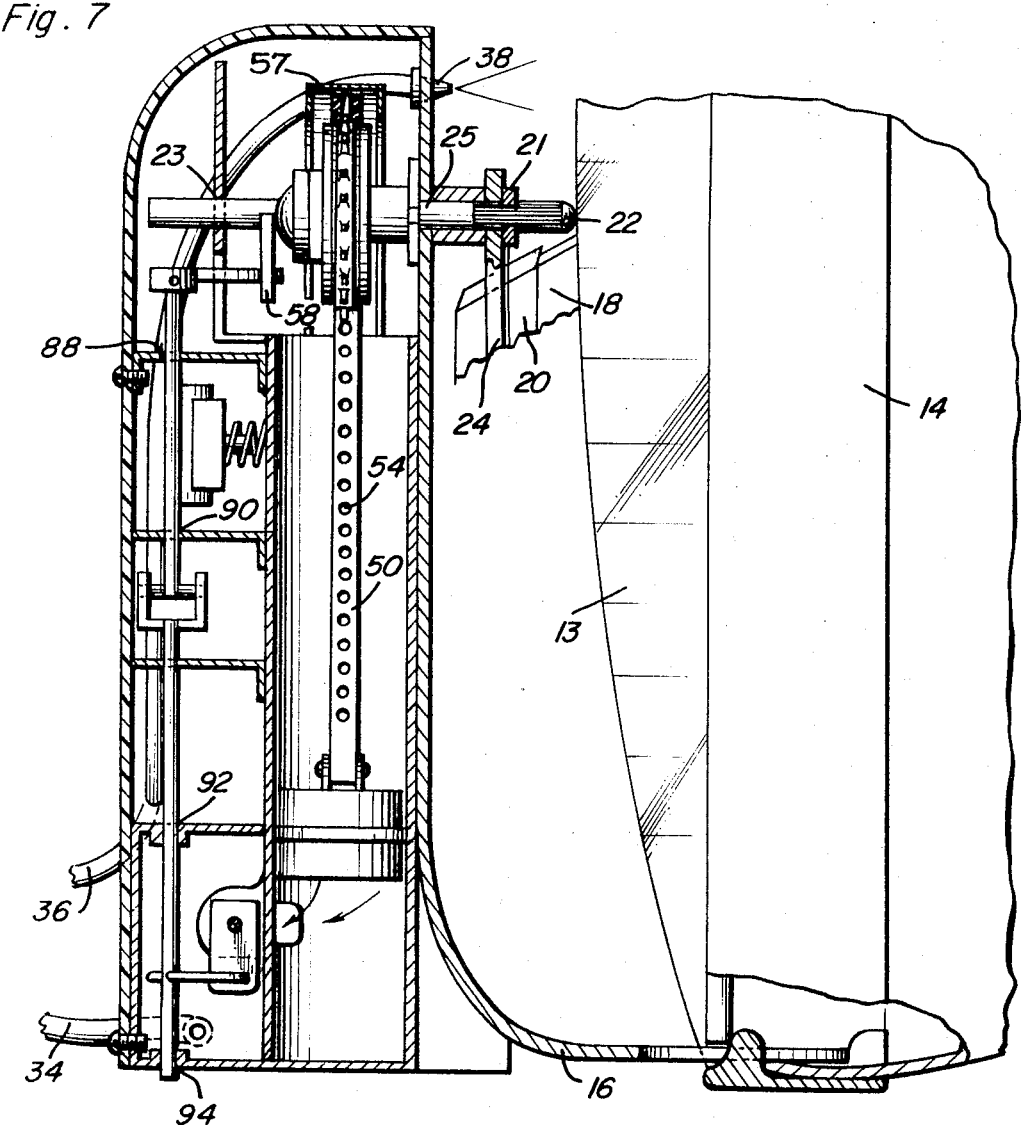
FIG. 7 is an enlarged sectional view taken along section 7—7 of FIG. 5.

With particular reference to FIGS. 3 and 7, it will be observed that fluid motor 30 is provided with a pair of spaced parallel cylinders 40 and 42 which accommodate pistons 44 and 46, respectively. Each piston is in sliding, sealed engagement with the associated cylinder by way of a conventional piston ring or the like, as indicated at 48. An elongated flexible belt or the like 50 is connected at its opposite ends to pistons 44 and 46 and extends around a sprocket 52 affixed to drive shaft 22. The belt is provided with a plurality of sprocket holes 54 equally spaced along its length, which drivingly engage teeth 56 associated with the sprocket wheel. A U-shaped retainer band 57 partially surrounds the sprocket to prevent disengagement of the belt. The pistons are arranged for travel in opposite directions, downward movement of piston 44 being accompanied by upward movement of piston 46. This, in turn, transmits rotary motion to the drive shaft by way of sprocket 52.

Piston 44 is pulled downwardly by way of vacuum pulled through line 34, as illustrated in FIG. 3. As piston 44 reaches the bottom of travel, the valve mechanism of the fluid motor is effective to communicate the vacuum source with cylinder 42 and piston 46, whereby piston 46 is pulled downwardly. At the same time, vacuum within cylinder 40 is relieved, whereby piston 44 is free to move upwardly under the influence of belt 50. Thus, the pistons continue to reciprocate back and forth to produce a reciprocal rotary motion at drive shaft 22.

Preferably, shaft 22 is splined at one end thereof to retentatively accommodate leaf springs 24 associated with the wiper blade. The support arm is held against axial movement on the drive shaft by way of a conventional split lock ring 21 or the like, with the drive shaft being rotatably supported in a pair of bearing holes 23 and 25. A lever arm 58 is affixed to the drive shaft for rotation therewith and extends radially outward from the shaft in a direction generally parallel to the wiper blade. As the drive shaft rotates, lever arm 58 is effective to initiate operation of the valve mechanism which, in turn, reverses the direction of piston travel.

With reference to FIG. 4-6, it will be observed that the valve mechanism associated with the present invention includes a pair of ball valves 60 and 62 which control communication of the vacuum source with the respective cylinders. The arrangement is such that when one of the ball valves is opened the other is closed, whereby only one cylinder is in communication with the vacuum source at any one time. Actuation of the ball valves is achieved by way of an actuator rod 64 which is slidably mounted to a pair of bearing walls 66 and 68 for reciprocation in a generally horizontal direction. With the actuator rod moved to the left, as shown in FIG. 5, ball valve 60 is opened and ball valve 62 is closed. With the actuator rod moved to the right, as shown in FIG. 6, the valves are reversed. With ball valve 60 opened, as shown in FIG. 5, the vacuum source is in communication with cylinder 40 to draw piston 44 downwardly. Of course, the opposite condition occurs when the actuator rod is moved to the right, as shown in FIG. 6. The cylinder associated with the closed valve is in communication with the atmosphere by way of a regulator valve, as indicated at 70, to allow the piston to move freely upward.

A flapper valve generally indicated by the numeral 72 in FIG. 3 is provided at the base of the cylinders and overlies regulator valve 70 by a generally "A" wall configuration. A flap member 74 of rubber or other flexible material is mounted along its top edge as indicated at 75 for free movement between a pair of apertures 76 and 78. Movement of the flap is effected by pressure differential. Thus, with the vacuum source in communication with cylinder 40, as illustrated in FIGS. 3 and 5, flap 74 is influenced to the left to cover and seal off aperture 76. At the same time, aperture 78 is exposed to permit airflow through regulator valve 70 into cylinder 42. When the ball valves are shifted to the opposite positions, vacuum in cylinder 42 is effective to pull flap 74 to the right into sealing engagement with aperture 78.

Operation of the ball valves is effected by way of a coupling with lever arm 58 associated with drive shaft 22. This coupling is best illustrated in FIGS. 4, 4a and 7. A striker plate 80 is affixed to the center of actuator rod 64 for movement therewith and is disposed along the path of travel of a bifurcated fork member 82. A pair of valve actuator shafts 84 and 86 are rotatably mounted in the motor housing by way of bearing surfaces 88, 90, 92, and 94. The shafts are connected to each other by way of a swivel joint generally indicated at 96. A lever member 98 is affixed to the top end of shaft 86 and is disposed within the path of rotary travel by lever arm 58. As the wiper blade approaches the end of a revolution, lever arm 58 engages lever member 98 to effect rotation of shaft 86. This rotation is transmitted to shaft 84 by way of joint 96. In addition, fork 82 is pivoted through an angular displacement to engage striker plate 80 and move rod 64 to effect valve operation. This valve operation causes drive shaft 22 to reverse direction until lever arm 58 again engages lever member 98 after approximately one full revolution and to again effect reversal of the valves.

In order to provide rapid and accurate actuation of the ball valves, a snap-action mechanism 100 is provided. A cam 102 is affixed to shaft 86 and engages a cam follower 104 with a lobe protruding therefrom. A coil compression spring 106 influences the lobe of the cam follower against cam 102. As shaft 86 is caused to rotate by lever member 98, cam 102 passes the center point or high point of the lobe against the influence of spring 106. The instant the cam passes the high point of the lobe, the forces of the coil compression spring take over and cause rapid movement of the cam to provide a "snap-action" which is transmitted to striker plate 80 by way of fork 82. Since lever arm 58 and lever member 98 define a lost motion connection, the snap-action movement of shaft 86 is not hindered by drive shaft 22, lever member 98, in fact, moving away from lever arm 58 after cam 102 passes the high point on the lobe.

Preferably, actuation of the valve mechanism occurs within an angular displacement of approximately 90° of shafts 86 and 84. During the first 45 degrees of shaft rotation, fork 82 acts as a lost motion connection, its movement having no affect upon striker plate 80. At approximately the 45° point of rotation, cam 102 passes the high point of the cam follower lobe with one of the sides of fork 82 just coming into engagement with the striker plate. At this point, the snap-action takes over, whereby an additional 45° of rotation is imparted to shaft 84 and fork 82. This rapidly advances striker plate 80 and actuator rod 64 to effect reversal of ball valves 60 and 62. It will be appreciated that the unique coupling arrangement, including a pair of lost motion connections and a snap action mechanism, responds to the wiper blade position to effect rapid switching of the valve mechanism.

Figure 8:
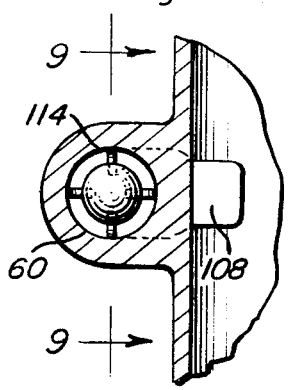
FIG. 8 is an enlarged sectional view of one of the valves associated with the present invention.
Figure 9:
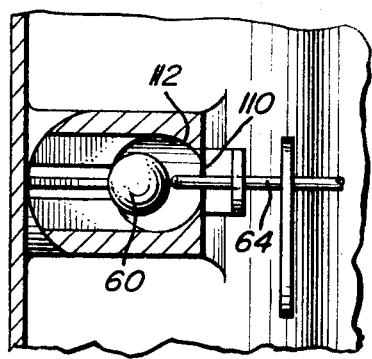
FIG. 9 is a sectional view of the valve shown in FIG. 8.

With reference to FIGS. 8 and 9, the structure of the ball valves may be seen in more detail. Preferably, each valve is provided with a first port 108 in communication with the associated cylinder and a second port 110 in communication with the vacuum source. A valve seat 112 defined by spherical surfaces is adjacent port 110 with actuator rod 64 extending through the port for engagement with ball 60. A passageway extends between ports 108 and 110 and is provided with a plurality of fins 114 which define fluid paths around the ball. FIG. 9 illustrates the valve in an opened position with actuator rod 64 moved to its end of travel to the left. When the actuator rod is moved to the right, ball 60 is free to move into seating engagement with surfaces 112 to provide a substantial seal between ports 110 and 108. The ball is moved into sealing engagement with the seating surfaces under the influence of the vacuum flow and is subsequently held in that position until engaged by actuator rod 64. Of course, it is not intended that the fluid motor associated with the present invention be limited to the valve mechanisms illustrated in the drawings. Other well known valve mechanisms may be utilized with appropriate modifications, if desired.

From the foregoing description, it will be appreciated that the vehicle headlamp wiper assembly of the present invention provides a versatile means for automatically cleaning headlamp lenses to permit the passage of maximum light therethrough for maximum visibility. The compactness of the fluid motor and associated components permit such to be mounted forward of the lens, toward the center thereof in a manner which does not adversely affect the headlamp operation, as little light, if any, passes through this area with most modern headlamp lens constructions.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A vehicle headlamp wiper assembly comprising a housing, a drive shaft rotatably supported by said housing, a wiper blade affixed to said drive shaft for rotation therewith, first and second cylinders associated with said housing, first and second pistons reciprocably mounted in said first and second cylinders respectively, power transmission means drivingly connecting said first and second pistons to said drive shaft for imparting rotation thereto upon reciprocation of said pistons, and valve means associated with said cylinders and operatively connected to said drive shaft for alternatively communicating said first and second cylinders with a vacuum source in response to movement of said wiper blade to said predetermined angular positions, said valve means including first and second valves associated with said first and second cylinders, respectively, one of said valves being opened to communicate the associated cylinder with said vacuum source when the other of said valves is closed to substantially seal its associated cylinder from said vacuum source, said valve means including an actuator rod reciprocally mounted in said housing between said first and second valves and movable between a first position wherein said first valve is opened and a second position wherein said second valve is opened, an oscillatable actuation shaft carried by said housing and disposed generally normal to said actuator rod, first lost motion connecting means including a first lost motion connection between said drive shaft and actuation shaft, and second lost motion connection means including a second lost motion connection between said actuation shaft and said actuator rod.

2. The combination of claim 1 including snap-action means operatively associated with said housing and said oscillatable shaft for snap-shifting said shaft to its limit positions of oscillation in response to said shaft being rotated past a predetermined central position of oscillation toward said limit positions.

3. A vehicle headlamp wiper assembly comprising a housing, a drive shaft rotatably supported by said housing, a wiper blade affixed to said drive shaft for rotation therewith, first and second cylinders associated with said housing, first and second pistons reciprocably mounted in said first and second cylinders respectively, power transmission means drivingly connecting said first and second pistons to said drive shaft for imparting rotation thereto upon reciprocation of said pistons, and valve means associated with said cylinders and operatively connected to said drive shaft for alternatively communicating said first and second cylinders with a vacuum source in response to movement of said wiper blade to said predetermined angular positions, said valve means including first and second valves associated with said first and second cylinders respectively, one of said valves being opened to communicate the associated cylinder with said vacuum source when the other of said valves is closed to substantially seal its associated cylinder from said vacuum source, said valve means including means coupling said first and second valves to said drive shaft, said coupling means including lost motion means for allowing rotation of said drive shaft and wiper blade through an angle between said predetermined positions without affecting operation of said first and second valves, said coupling means further including snap-action means associated with said lost motion means for effecting rapid simultaneous operation of said first and second valves upon movement of said wiper blade to said predetermined angular positions, said valve means including an actuator rod reciprocably mounted between said first and second valves and movable between a first position wherein said first valve is opened and a second position wherein said second valve is opened, said coupling means including a rotatable actuation shaft carried by said housing and generally perpendicular to said actuator rod, said lost motion means including a first lost motion connection between said drive shaft and actuation shaft, and a second lost motion connection between said actuation shaft and said actuator rod.

4. The structure set forth in claim 3 wherein said snap-action means is associated with said actuation shaft intermediate said first and second lost motion connections.

5. The structure set forth in claim 1 wherein said power transmission means includes an elongated, flexible member with a first end attached to said first piston and a second end attached to said second piston, and a rotary drive member affixed to said drive shaft, said elongated flexible member being in driving engagement with said rotary drive member to effect rotation of said drive shaft.

6. The structure set forth in claim 5 wherein said cylinders are in spaced parallel relation to each other, said elongated flexible member being wrapped around said rotary drive member intermediate said first and second ends.

7. The structure set forth in claim 6 wherein said rotary drive member includes a plurality of sprocket teeth in operative engagement with openings in said elongated flexible member.

* * * * *